United States Patent [19]

Inoue et al.

[11] Patent Number: 4,475,341

[45] Date of Patent: Oct. 9, 1984

[54] EXHAUST MANIFOLD DEVICE FOR ENGINES

[75] Inventors: Kazuo Inoue, Tokyo; Kentaro Kato, Saitama, both of Japan

[73] Assignee: Honda Giken Kogyo Kabushiki Kaisha, Tokyo, Japan

[21] Appl. No.: 379,751

[22] Filed: May 19, 1982

[30] Foreign Application Priority Data

May 19, 1981 [JP] Japan .................. 56-73044[U]

[51] Int. Cl.³ .................. F02B 37/00; F01N 7/10
[52] U.S. Cl. .................. 60/605; 60/280; 60/322; 60/323; 138/148
[58] Field of Search .................. 60/322, 323, 605, 280; 138/148, 149

[56] References Cited

U.S. PATENT DOCUMENTS

| 1,565,254 | 12/1925 | Bystrom | 138/148 |
|---|---|---|---|
| 3,173,241 | 3/1965 | Birmann | 60/605 |
| 3,490,794 | 1/1970 | Swanson | 60/322 |
| 4,142,366 | 3/1979 | Tanahashi | 60/322 |
| 4,201,048 | 5/1980 | Fisher | 60/322 |
| 4,372,120 | 2/1983 | Ford | 60/605 |

FOREIGN PATENT DOCUMENTS

| 2314999 | 1/1977 | France | 60/323 |
|---|---|---|---|
| 158334 | 2/1933 | Switzerland | 60/605 |
| 392852 | 5/1933 | United Kingdom | 60/322 |
| 547711 | 9/1942 | United Kingdom | 60/605 |

Primary Examiner—Douglas Hart
Attorney, Agent, or Firm—Irving M. Weiner; Pamela S. Burt; Anthony L. Cupoli

[57] ABSTRACT

An exhaust manifold device for an engine including at least one pair of cylinders arranged substantially in the form of a V and a turbosupercharger driven with exhaust gases of the cylinders to supply compressed air thereto. The exhaust manifold device comprises a pair of exhaust gas inlet members for receiving the exhaust gases, the inlet members being connected integrally with either of the cylinders, a pair of communication members for conducting the exhaust gases, the communication members having the longitudinal lengths thereof variable and either ends thereof connected with either of the inlet members, and an exhaust gas collecting member for collecting the exhaust gases to supply same to the turbosupercharger, the collecting member being connected with the respective other ends of the communication members.

In hot temperature operation, the thermal expansion of the exhaust manifold device can be effectively absorbed, thus eliminating undue stresses.

4 Claims, 6 Drawing Figures

EXHAUST MANIFOLD DEVICE FOR ENGINES

BACKGROUND OF THE INVENTION

1. Field of the Invention

The present invention relates to an exhaust manifold device for engines, and particularly to an exhaust manifold device for turbosupercharged V-type engines.

2. Description of Relevant Art

In the art of an engine having at least one pair of cylinders arranged substantially in the form of a V and a turbosupercharger driven with exhaust gases of the cylinders to supply compressed air thereto, there have been known exhaust manifold devices adapted to collect the exhaust gases from the cylinders to supply same to the turbosupercharger.

Such exhaust manifold devices for engines, which undergo relatively large thermal expansions due to hot exhaust gases, have been considerably restricted in design and manufacture with respect to the strength of materials, sealability and the like at related connecting portions, so that the degree of freedom in design has been suppressed.

The present invention eliminates such disadvantages in conventional exhaust manifold devices for engines.

SUMMARY OF THE INVENTION

The present invention provides an exhaust manifold device for an engine including at least one pair of cylinders arranged substantially in the form of a V and a turbosupercharger driven with exhaust gases of the cylinders to supply compressed air thereto, comprising a pair of exhaust gas inlet members for receiving the exhaust gases, the inlet members being connected integrally with either of the cylinders, a pair of communication members for conducting the exhaust gases, the communication members having the longitudinal lengths thereof variable and either of the ends thereof connected with either of the inlet members, and an exhaust gas collecting member for collecting the exhaust gases to supply same to the turbosupercharger, the collecting member being connected with the respective other ends of the communication members.

An object of the present invention is to provide an exhaust manifold device for turbosupercharged V-type engines which can effectively absorb thermal expansions due to hot exhaust gases, thus being advantageous with respect to the strength of materials, sealability and the like at related connecting portions, as well as substantial improvement in the freedom of design, and thus simplifying manufacture, reducing cost, etc.

The above and further objects, features and advantages of the present invention will become apparent from the following detailed description of preferred embodiments of the invention when read in conjunction with the accompanying drawings.

DETAILED DESCRIPTION OF THE PREFERRED EMBODIMENTS

Figure 1:
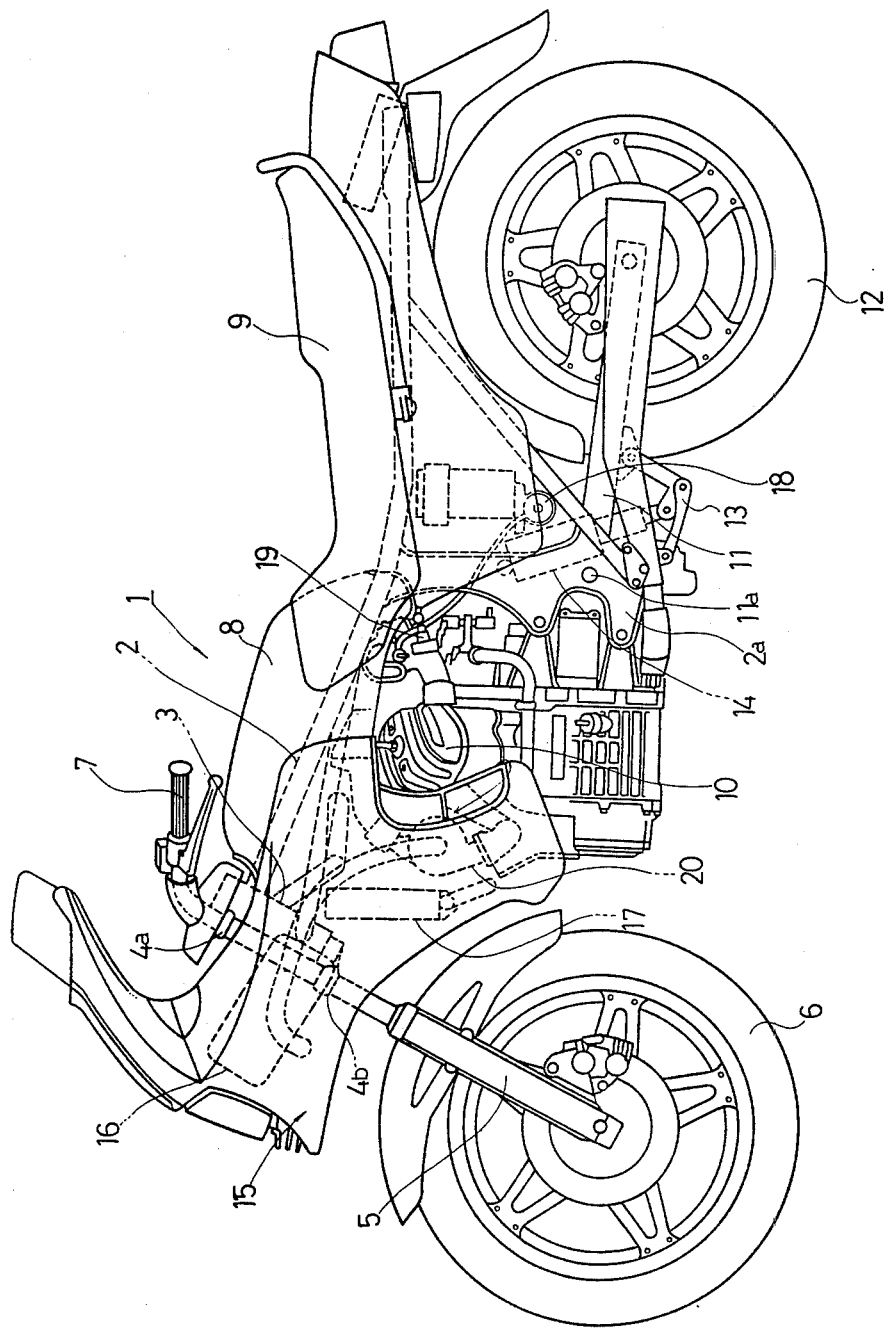
FIG. 1 is a side view of a motorcycle carrying a turbosupercharged engine provide with an exhaust manifold device according to a first embodiment of the invention.

Referring first to FIG. 1, generally designated by reference numeral 1 is a motorcycle having a vehicle frame 2. To the front end of the frame 2, is secured a head tube 3 supporting a front fork 5 as a support member of a front wheel 6 through top and bottom bridges 4a, 4b, the top bridge 4a having a handlebar 7 mounted thereon so as to be integrally rotable therewith. On an upper front portion of the frame 2 is installed a fuel tank 8 and rearwardly thereof is disposed a driver's seat 9, while at a lower front portion of the frame 2 there is mounted a water-cooled V-type two-cylinder engine 10 having the rear end thereof supported by a pair of brackets 2a extending downwardly from an intermediate portion of the frame 2. Pivotally connected to the brackets 2a by a pin 11a is the front end of a rear fork 11 extending rearwardly and supporting at the rear end thereof a rear wheel 12. Between a front portion of the rear fork 11 and the frame 2 is interposed a rear cushion unit 14 including a linkage 13 adapted to progressively increase the damping force of the cushion unit 14.

The motorcycle 1 has the front portion thereof covered by a member 15 for fairing and shielding against the wind, the fairing member 15 having therein an air cleaner 16 disposed at a relatively forward position. Behind the air cleaner 16, is disposed a radiator 17 of the engine 10. While running, the engine 10 is supplied with fuel from the fuel tank 8 through a fuel feed pump 18 and a fuel injector 19 and with compressed air from a turbosupercharger 20.

Figure 2:
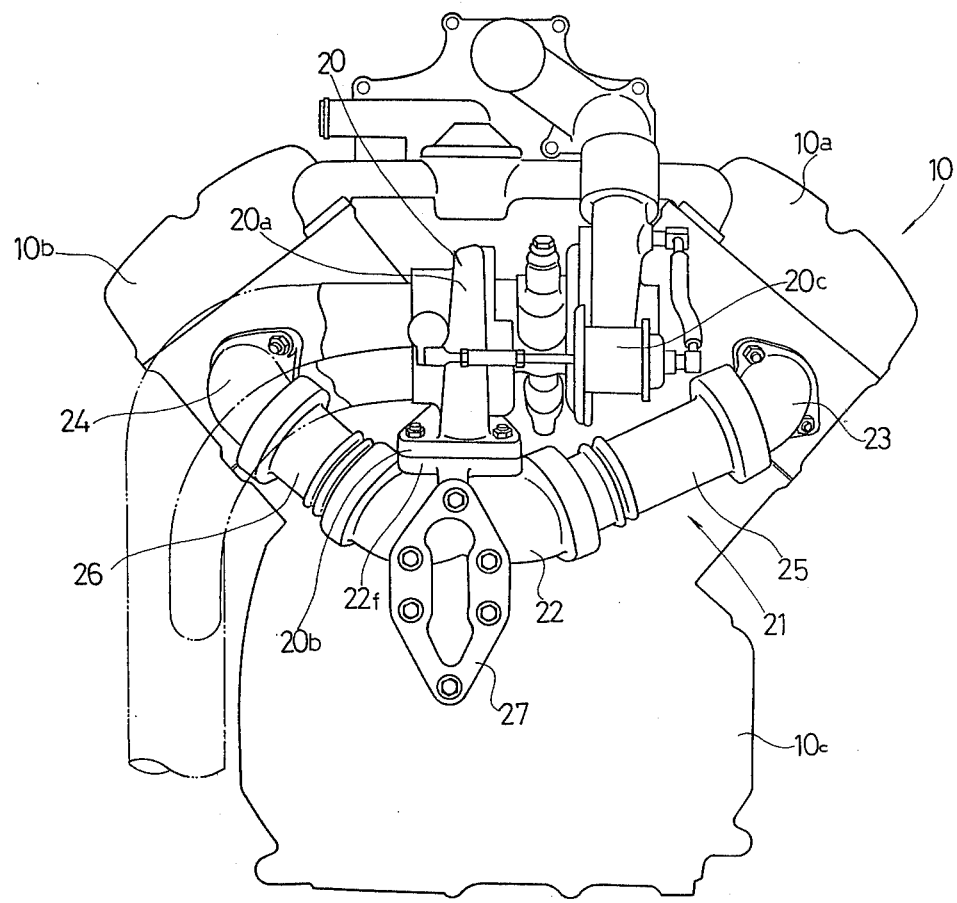
FIG. 2 is an enlarged elevational view of the engine of FIG. 1.

With reference to FIGS. 2 to 5, particularly referring to FIG. 2, the engine 10 includes a pair of cylinders 10a, 10b extending obliquely leftwardly and rightwardly, respectively, thereby defining a configuration substantially in the shape of a V and an exhaust manifold 21 disposed in front of the cylinders 10a, 10b for the purpose of collecting exhaust gases therefrom. The exhaust manifold 21 comprises a forked exhaust gas collecting portion 22, a pair of left and right exhaust gas inlet portions 23, 24 connected with respective exhaust ports (not shown) of the left and right cylinders 10a, 10b, and a pair of left and right communication members 25, 26 connected at the outer ends thereof with the left and right inlet portions 23, 24, respectively, and at the inner ends thereof with the collecting portion 22, so that the communication members thus communicate with each other. The communication members 25, 26 are made variable with respect to the longitudinal length thereof in a later described manner. The collecting portion 22 and the inlet portins 23, 24 are castings of a heat resisting metal, while the communication members 25, 26 are made of a heat resisting steel sheet.

Figure 3:
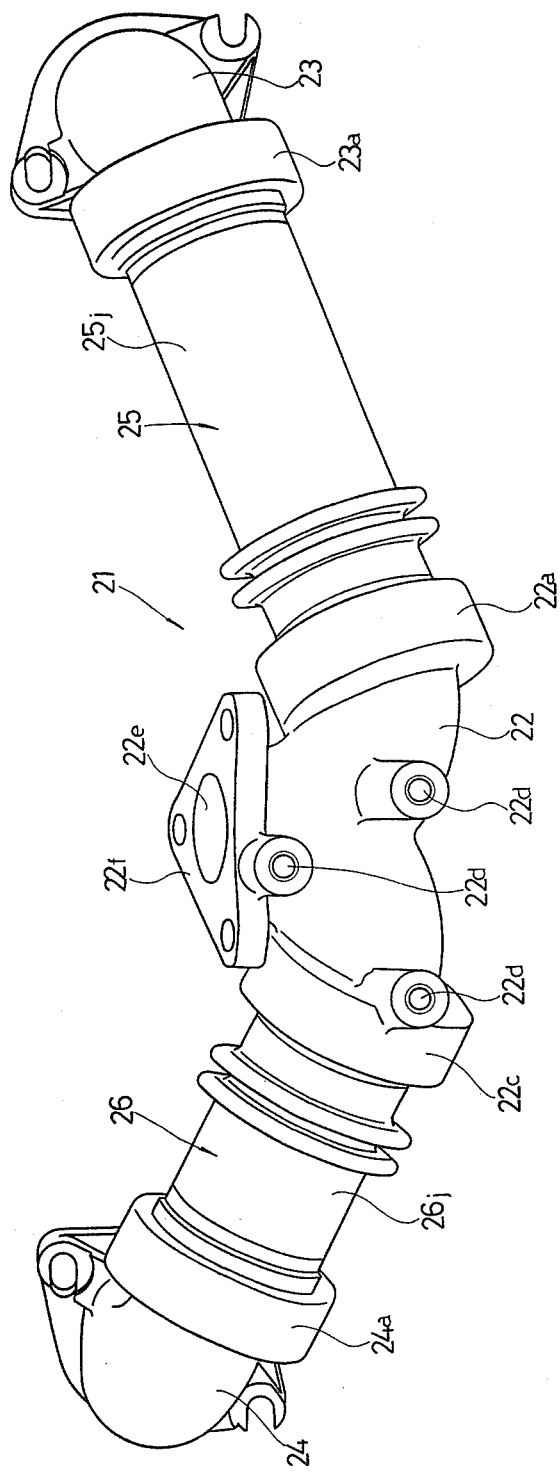
FIG. 3 is an enlarged elevational view of the exhaust manifold device of FIG. 1.
Figure 4:
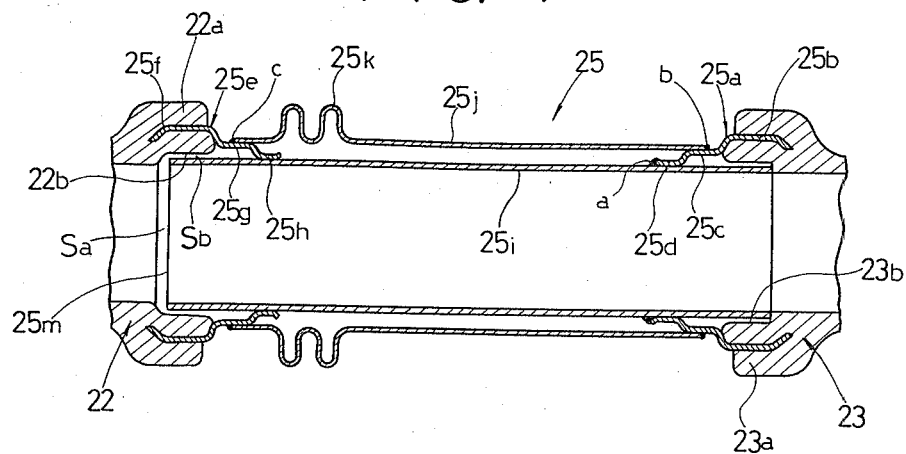
FIG. 4 is a longitudinal sectional view showing the connection between a left inlet portion and a collecting portion of the exhaust manifold device of FIG. 3.

As shown in FIGS. 3 and 4, the left inlet portion 23 of the exhaust manifold 21 is provided at the downsteam end thereof with a flanged portion 23a to which an inlet side support tube 25a of the communication member 25 is secured by inlaying the base portion 25b thereof by way of a casting. The support tube has the remaining portion thereof projecting in the downstream direction and reduced in a stepped manner to form a relatively large diameter portion 25c and a relatively small diameter portion 25d. Further, at the left upstream end of the collecting portion 22 of the exhaust manifold 21, there is provided a flanged portion 22a to which an outlet side support tube 25e is secured by inlaying the base portion 25f thereof by way of a casting. The support tube 25e has the remaining portion thereof projecting in the upstream direction and, like the inlet side support tube 25a, reduced in a stepped manner to form a relatively large diameter portion 25g and a relatively small diameter portion 25h.

In the above construction, the communication member 25 comprises an inner tube 25i made of a steel sheet and having both ends thereof freely fitted in either of respective stepwise increased inner diameter portions 22b, 23b formed in the corresponding ends of the flanged portions 22a, 23a, and a flexible outer tube 25j having both ends thereof fitted on either of the respective large diameter portions 25c, 25g of the support tubes 25a, 25e, the outer tube 25j being formed at least partially along its longitudinal direction thereof with a bellows 25k. The inner tube 25i is fitted in the respective small diameter portions 25d, 25h of the support tubes 25a, 25e slidably with respect to one of the latter two and fixedly with respect to the other one thereof by way of a welding (a) or the like, so that the inner tube 25i has a free end, i.e., the outlet end 25m thereof in this embodiment, slidable for an axial clearance Sa provided between the outlet end 25m and the inner diameter portion 22b of the flanged portion 22a, while being effectively prevented against hunting due to exhaust gas pulsation and the like. On the other hand, the outer tube 25j is secured at both ends thereof to the respective large diameter portions 25c, 25g of the support tubes 25a, 25e by way of welding (b), (c) or the like. The axial clearance Sa between the inner tube 25i and the inner diameter portion 22b of the flanged portion 22a is continuous with a radial clearance $S_b$ therebetween, thereby assuring a labyrinth effect.

Figure 5:
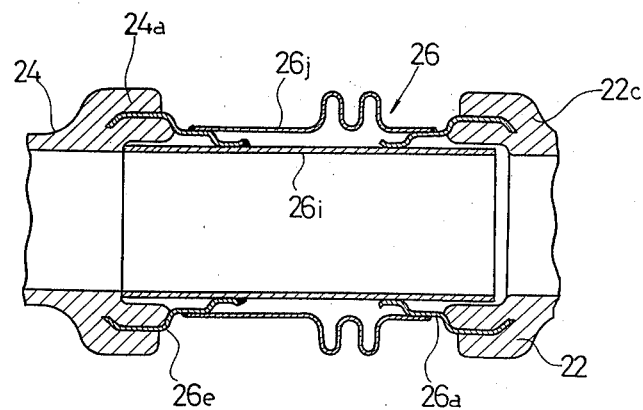
FIG. 5 is a longitudinal sectional view showing the connection between a right inlet portion and the collecting portion of the exhaust manifold device of FIG. 3.

As shown in FIGS. 3 and 5, the exhaust manifold 21 further includes on the right side thereof, similarly to the foregoing description on the left side thereof, a flanged portion 24a formed on the downstream end of the right inlet portion 24, an inlet side support tube 26e of the communication member 26 secured to the flanged portion 24a, a flanged portion 22c formed on the right upstream end of the collecting portion 22, and an outlet support tube 26a of the communication member 26 secured to the flanged portion 22c. An inner tube 26i has both ends thereof freely fitted in either of the flanged portions 22c, 24a and the two outer circumferential portions near either end thereof fitted one slidably in the support tube 26a and the other fixedly in the support tube 26e. An outer tube 24j encloses the inner tube 26i and has both ends thereof fitted fixedly in either of the support tubes 26a, 26e, while being formed at least partially along its longitudinal direction with a bellows.

As illustrated in FIGS. 2 and 3, the exhaust manifold 21 is mounted on a crank case 10c of the engine 10 by fixing thereto a stay 27 adapted to support the manifold 21 while inserting bolts or like in a plurality of fitting bosses 22d formed on the front surface of the collecting portion 22. Further, the collecting portion 22 has at the top thereof a flanged support portion 22f formed therethrough with an exhaust gas outlet 22e for admitting the exhaust gases to a turbine 20a of the turbosupercharger 20 connected with the flanged portion 22f through a companion flange 20b, thereby driving an air compressor coupled with the turbine 20a to supercharge compressed air.

As will be understood from the foregoing description, the thermal expansion of the exhaust manifold 21 can be absorbed by the sliding of the inner tubes 25i, 26i and compression of the outer tubes 25j, 26j, thus eliminating the fear of undue stresses which otherwise may be caused at the inlet portions 23, 24 and the collecting portion 22.

Figure 6:
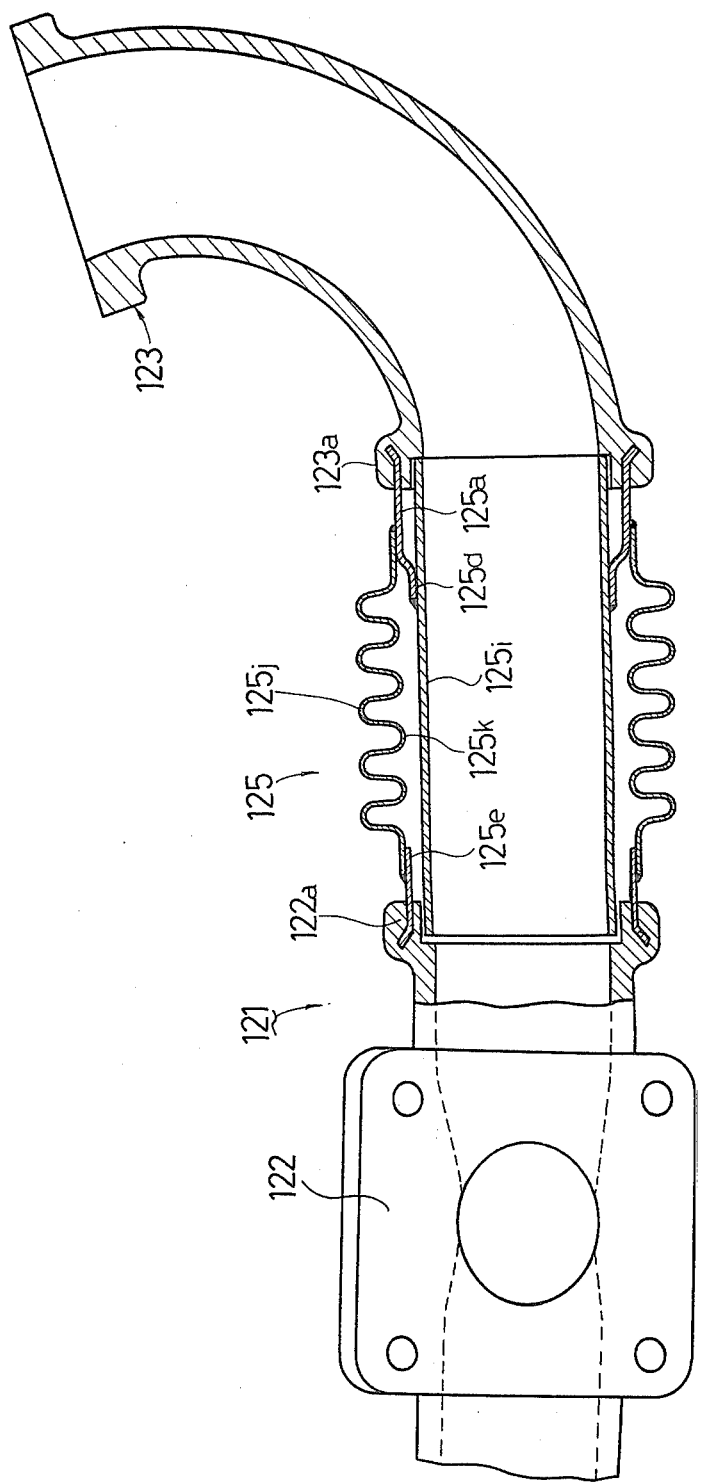
FIG. 6 is an elevational view, with an essential part longitudinally sectioned, showing a left half portion of an exhaust manifold device according to a second embodiment of the invention.

Referring now to FIG. 6, there is shown an exhaust manifold 121 of a V-type two-cylinder engine (not shown). The exhaust manifold 121 having at the center thereof an exhaust gas collecting portion 122 is symmetrical at the right and left with respect to the collecting portion 122, and therefore will be described hereinbelow with respect to only the left half portion thereof which comprises an exhaust gas inlet portion 123 connected with either of respective exhaust ports (not shown) of a pair of cylinders (not shown) of the engine, and a communication member 125 connecting the inlet portion 123 with the collecting portion 122. The communication member 125 comprises an inner tube 125i having both ends thereof freely fitted in either of flanged portions 122a, 123a formed on the left upstream end of the collecting portion 122 and on the downstream end of the inlet portion 123, respectively, and an outer tube 125j fitted at both ends thereof fixedly on either of support tubes 125e, 125a secured respectively to the flanged portions 122a, 123a and formed along substantially the entire length thereof with a bellows 125k. The inlet side support tube 125a is stepped once so as to be reduced to have a distal portion 125d of a relatively small diameter fitted fixedly on the inner tube 125i, while the outlet side support tube 125e has the form of a substantially straight tube, thereby simplifying manufacture as well as reduce cost.

We claim:

1. In an engine including at least one pair of cylinders arranged substantially in the form of a V and a turbosupercharger driven with exhaust gases of said cylinders to supply compressed air thereto, an exhaust manifold device, comprising:

a pair of exhaust gas inlet members for receiving said exhaust gases;

said inlet members being connected integrally with either of said cylinders;

a pair of communication members for conducting said exhaust gases;

said communication members having the longitudinal lengths thereof variable and either ends thereof connected with either of said inlet members;

an exhaust gas collecting member for collecting said exhaust gases to supply same to said turbosupercharger; and said collecting member being connected with the respective other ends of said communication members;

each of said communication members comprising an outer tube secured at either end thereof to said collecting member and either of said inlet members and formed at least partially along the longitudinal direction thereof with a bellows and an inner tube provided through said outer tube, said inner tube having one end thereof secured to either of said inlet members and said collecting member and the other end thereof axially movable relative to said outer tube;

said communication member further comprising first and second support tubes secured respectively to said inlet member and said collecting member;

said outer tube being fixedly fitted on said first and second support tubes; and said inner tube being fixedly fitted at the outer circumferential portion near said one end thereof and slidably fitted at another circumferential portion near said other end thereof in said first and second support tubes.

2. An exhaust manifold device according to claim 1, wherein:

said inlet member and said collecting member have stepped inner diameter portions with relatively large diameters, respectively; and said inner tube is freely fitted at both said ends thereof in either of said inner diameter portions.

3. An exhaust manifold device according to claim 1, wherein:

at least either of said first and second support tubes is reduced in a stepped manner to have a relatively large diameter portion and a relatively small diameter portion;

said outer tube is fitted at one end thereof fixedly on said large diameter portion; and said outer circumferential portion near said one end of said inner tube is fitted fixedly in said small diameter portion.

4. An exhaust manifold device according to claim 3, wherein:

the other of said support tubes has the form of a substantially straight tube.

* * * * *